United States Patent [19]

Dory

[11] 4,281,661
[45] Aug. 4, 1981

[54] MEDICAL ECHO SOUNDING APPARATUS WITH A WIDE SECTOR SCANNING ANGLE

[75] Inventor: Jacques Dory, Meaux, France

[73] Assignee: C. G. R.-Ultrasonic, France

[21] Appl. No.: 956,707

[22] Filed: Nov. 1, 1978

[30] Foreign Application Priority Data

Nov. 23, 1977 [FR] France .................. 77-35200

[51] Int. Cl.³ .......................................... A61B 10/00
[52] U.S. Cl. ...................... 128/660; 73/644
[58] Field of Search .................. 128/660–661, 128/618–621, 611; 73/642, 644

[56] References Cited

U.S. PATENT DOCUMENTS

| B 270,274 | 2/1976 | Green | 340/8 L |
|---|---|---|---|
| 3,023,611 | 3/1962 | Howry | 128/660 |
| 3,168,659 | 2/1965 | Bayre et al. | 340/8 L |
| 3,387,604 | 6/1868 | Erikson | 128/24 A |
| 3,687,219 | 8/1972 | Langlois | 340/8 L |
| 3,927,557 | 12/1975 | Viertl | 128/660 |
| 3,996,792 | 12/1976 | Kubota et al. | 73/611 |
| 4,084,582 | 4/1978 | Nigam | 128/660 |
| 4,143,554 | 3/1979 | Nagy et al. | 73/626 |

FOREIGN PATENT DOCUMENTS

| 179076 | 2/1966 | Fed. Rep. of Germany | 73/642 |
|---|---|---|---|
| 2710038 | 7/1978 | Fed. Rep. of Germany | 128/660 |
| 2318420 | 3/1977 | France | 128/660 |

OTHER PUBLICATIONS

Knollman, G. C. et al., "Variable-Focus Liquid-Filled Hydro-Acoustic Lens," Journ. Acoust. Soc. of Amer., Vol. 49 No. 1, Part II.

Handbook of Chemistry & Physics, CRC Publ. pp. 253–255, 1964 p. E-28.

Primary Examiner—Robert W. Michell
Assistant Examiner—Francis J. Jaworski
Attorney, Agent, or Firm—William A. Drucker

[57] ABSTRACT

Medical echo sounding apparatus of the sector scanner type in which the coupling liquid between the ultrasonic transmitting-receiving head and the medium being examined results in a speed of propagation of the ultrasonic radiation which is substantially less than the speed of propagation in the medium being examined. For use in obstetrics and cardiology and for the construction of sounding heads of small dimension.

2 Claims, 1 Drawing Figure

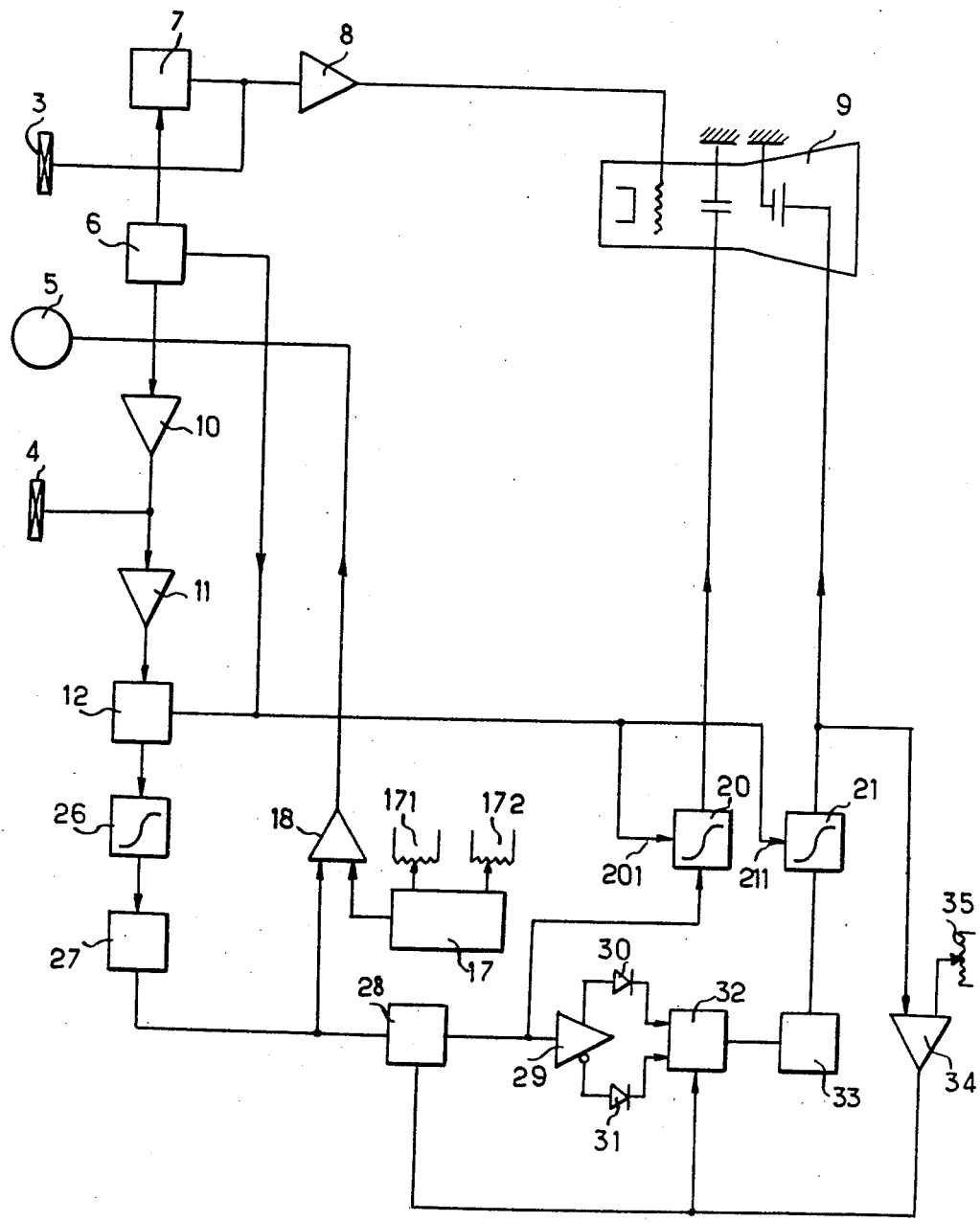

MEDICAL ECHO SOUNDING APPARATUS WITH A WIDE SECTOR SCANNING ANGLE

BACKGROUND OF THE INVENTION

The present invention relates to medical echo sounding apparatus and in particular apparatus making use of ultrasonic heads producing a beam which can be employed to make a rapid angular scan within a search plane, the said beam being projected into the medium being examined via a coupling liquid contained in a chamber.

Such an apparatus is described in particular in U.S. Pat. application filed Nov. 1, 1978 by the same applicant under Ser. No. 956,706 for: "Echo sounding apparatus involving an oscillating mirror use use in medical diagnosis".

THE PRIOR ART

In the known state of the art water is used as the coupling medium.

OBJECT OF THE INVENTION

The applicant has discovered that there are unexpected and important advantages in using a coupling liquid where the speed of propagation of the ultrasonic radiation is substantially different to the speed of propagation in water and in particular when the speed in the coupling liquid is lower.

This feature of the invention can be usefully employed in conjunction with the use of a chamber having a convex surface at the ultrasonic beam outlet with a view to focussing that beam to some extent.

In the case where the apparatus involves a type B display, the invention is also concerned with an arrangement of the electronic scanning control circuit for the cathode ray tube that ensures that the scanning of the screen of that tube strictly corresponds to the displacement of the ultrasonic beam in the medium being examined.

The advantages and particular features of the invention will become evident on referring to the following description.

BRIEF DESCRIPTION OF THE DRAWINGS

The single FIGURE is a schematic diagram illustrating a preferred arrangement, according to the invention, of the control circuits of a type B display, echo sounding apparatus.

DESCRIPTION OF THE PREFERRED EMBODIMENT

A practical arrangement of the apparatus, with the exception of the electronic circuits, can usefully be as described in the patent application mentioned above. Thus the apparatus will include an oscillating mirror driven by a motor 5 and reflecting the ultrasonic radiation emitted by the transducer 3. An auxiliary reflecting element, rigidly attached to the mirror spindle, is used in conjunction with an auxiliary transducer 4 so as to result in intervals between transmitted and received pulses that are proportional to sin i plus a constant where i is the angle that the mirror makes with the vertical reference plane, or effectively the angle of incidence of the ultrasonic beam on the membrane. On arriving at the membrane the ultrasonic pulse will have travelled through a distance of d.cos i through the liquid contained in the chamber.

The invention also applies however in the case where the mechanical scanning of the ultrasonic beam is arranged in a different way from that described here.

The invention is mainly concerned with the use of a coupling liquid in which the speed of propagation of ultrasonic radiation C1 is appreciably less than the speed of propagation C2 in the medium being examined.

The different speeds of propagation result in a refraction of the ultrasonic beam at the interface of the two media. Thus the beam projected into the medium being examined is emitted from the sounding head at an angle r to a perpendicular to the membrane such that :

$$\sin r = n \sin i$$

where
$n = C2/C1$

The scanning control circuit of the cathode ray tube described in the patent application mentioned above would not in this case result in a scanning of the screen of the cathode ray tube corresponding at all times to the displacement of the ultrasonic beam. This deficiency can however be remedied by adding to the circuit as described below.

The store 19—see FIG. 3 of the patent application mentioned above—would be programmed to provide outputs of either C1 cos i or C2 cos r according to whether the ultrasonic pulse was travelling through the coupling liquid or the medium being examined. An additional output of either C1 sin i or C2 sin r, going to integrator 20 in place of the normal input, would also be provided on the same basis. The switching of the store so that it would provide either one of the two pairs of values would be effected by a pulse coming from the comparator 22.

It is clear in fact that the velocity components of the ultrasonic beam amount to C1 cos i and C1 sin i before refraction and to C2 cos r and C2 sin r after refraction, the transition occurring at the moment when the comparator 22 provides an output pulse. Apart from this it was considered preferable to give a detailed description of an analogue version of the circuit.

A repetitive electrical pulse generator 6 modulates a high frequency transmitter 7, the output of this latter going to the transducer 3 which transmits incident echos to the control electrode of the cathode ray tube 9 via the amplifier 8.

The auxiliary transducer 4 is excited by the pulses coming from the pulse generator 6 and the associated amplifier 10 and it then transmits echo signals picked up from the auxiliary reflecting element via the amplifier 11 to the flip-flop 12 which is also triggered by pulses from the pulse generator 6. The square waves delivered by this flip-flop accordingly have a width that is proportional to sin i. These square waves go to an integrator 26 which converts them into constant-slope saw-tooth pulse of the same width as the corresponding square waves. The amplitude of each saw-tooth pulse is detected by a peak voltage detector 27 which delivers a steady output voltage varying in steps with each transmission cycle. This stepped voltage goes to the differential amplifier 18 where it is compared with another saw-tooth signal supplied by the saw-tooth pulse generator 17, means being provided here for adjusting the frequency, amplitude and d.c. component of this signal. The amplified error voltage delivered by the differential amplifier 18 serves for the servo operation of the motor 5 as described in the patent application mentioned above.

The stepped voltage from the peak voltage detector 27 also goes to a switchable multiplying circuit 28 which is controlled by a signal appearing at the input thereof and which delivers, depending on whether this input signal is present or not, an output voltage proportional to either C1 sin i or to C2 sin r, the latter expression being equivalent to $(C2^2/C1)$ sin i. Thus the ratio of these two voltages amounts to the known value $n^2$. The multiplier circuit can accordingly consist of a simple resistance bridge with the switching involving the short circuiting of one arm of that bridge.

These output voltages go to a complementary circuit designed to transform the sine signals to their cosine equivalents and including the amplifier 29 which delivers an output to an analogue-digital convertor 32 via the diode 30 and an inverse of the same output via diode 31.

The angle i does not vary beyond $\pm 90°$ and the absolute value of sin i can accordingly be finally applied to the suitably programmed random access store 33 in order to obtain the required cos i signal.

The C1 sin i or C2 sin r signals delivered by the multiplier 28 go to the integrating circuit 20 which is also supplied, on input 201, with a synchronising pulse coming from the pulse generator 6, the output of this integrator in turn going to the vertical Y deflection coils of the cathode ray tube 9 while the outputs C1 cos i or C2 cos r from the complementary circuit go the integrator 21 which also receives a synchonising pulse on input 211 coming from the pulse generator 6, the output of this integrator in turn going to the horizontal X deflection coils of the cathode ray tube. These integrators supply signals which are respectively proportional to C1 t cos i and C1 t sin i followed by C2 t cos r and C2 t sin r so that the scanning of the cathode ray tube screen by the electron beam corresponds to the angular position of the ultrasonic beam over its complete trajectory, i.e. both upstream and downstream from the membrane.

The switching signal required for the operation of the multiplier 28 comes from the comparator 34, which compares the output of the integrator 21 with the voltage from the potentiometer 35, the latter being adjusted to provide a voltage corresponding to the distance d.

The selection of a coupling liquid in which the speed of propagation of ultrasonic radiation is, for example, one half of the speed of propagation in biological tissue does not present any difficulty for an experienced person.

By way of an example, certain commercially available liquids containing fluorine can be employed. Their density is approximately double that of water and as a result these liquids have an acoustic impedance approaching that of water. The very low coefficient of absorption of these liquids can be increased by adding a fluorine content grease which does not have any appreciable effect on the other characteristics.

As a result of using a coupling liquid in which the speed of propagation of ultrasonic radiation is less than that in the medium being examined it is possible to employ a housing of smaller dimensions (e.g. half the size in the case considered) compared to the size that would be required on using water as the coupling medium while at the same time respecting the condition that the time of propagation through the coupling liquid be greater than the time of propagation through the medium being examined. This latter is a necessary condition if it is required that the parasitic echos resulting from successive reflections from the membrane, following the second reflection, appear after reception of the useful signal.

The refraction resulting from this difference in the two speeds of propagation, where $C2 > C1$, also results in an appreciable increase in the angle swept through by the ultrasonic beam over a given sector and a corresponding reduction in the angular displacement of the mirror and hence in the size and weight of the apparatus which is particularly useful for certain applications such as obstetrics or cardiology. In addition the wavelength of the ultrasonic radiation, for a given frequency, will be shorter in the special liquid than would be the case in water and the consequent reduction in the divergence of the beam improves the resolution of any examination. This resolution can be further improved on providing a curved membrane of a suitable and previously calculated shape. Given the different speeds of propagation, the interface between the two media functions in effect as a lens which can serve to focus the ultrasonic beam in a plane perpendicular to the plane being scanned.

It should be noted that given the refraction of the beam it is necessary for the membrane to be rigid in order to avoid distortions of the image.

I claim:

1. An ultrasonic sector scanner for the examination of a patient's body, said scanner comprising: a housing having a membrane transparent to ultrasonic waves and containing a liquid in which the speed of propagation of ultrasonic waves is substantially lower than the speed of propagation of ultrasonic waves in water; timing means for generating timing signals; transmitter-receiver means in said housing and operative in response to said timing signals, said transmitter-receiver means producing a beam of pulsed ultrasonic wave signals and receiving echoes of said signals reflected from the body under examination; and scanning means periodically sweeping the signal beam angularly across the membrane in synchronism with the said timing signals; said scanner further comprising cathode ray tube display means for displaying a sectional image of the patient's body, said display means including a brightness control electrode, means for controlling the vertical deflexion of the electron beam of the cathode ray tube, and means for controlling the horizontal deflexion of the said electron beam; circuit means connecting the said brightness control electrode to the said transmitter-receiver means for displaying the said echos, angular scanning control means for generating analog signals proportional to the sine of the angle of incidence of the said signal beam on the membrane; switchable multiplier means connected to said angular scanning control means, said switchable multiplier means having a control input and an output, and providing a first voltage, proportional to the speed of propagation of the signal beam within the coupling liquid, multiplied by the said sine, when the said control input is not energized, and a second voltage, proportional to the speed of propagation of the signal beam in the said body, multiplied by the sine of the angle of refraction of the signal beam from the membrane, when the said control input is energized; first integrator means connecting the output of the switchable multiplier means to the said vertical deflexion control means; means for converting the first voltage into a third voltage proportional to the speed of propagation of the signal beam in the liquid, multiplied by the cosine of the said angle of incidence and for converting the second voltage into a fourth voltage proportional to the speed of propagation of the signal beam in the body, multiplied by the cosine of the said angle of refraction; second integrator means connecting the said voltage converting means to the said horizontal deflexion control means and comparator means, connected to the said second integrator means, providing a control signal energizing the control input of the switchable multiplier means each time the third voltage exceeds a predetermined reference voltage.

2. An ultrasonic sector scanner according to claim 1 wherein the membrane is convex towards the exterior of the housing and shaped so as to focus the signal beam projected into the medium examined.

* * * * *